(12) United States Patent
Ahuja et al.

(10) Patent No.: US 12,395,564 B2
(45) Date of Patent: Aug. 19, 2025

(54) SYSTEMS AND METHODS FOR REAL-TIME IDENTITY PROOFING WITH VERIFICATION

(71) Applicant: JPMORGAN CHASE BANK, N.A., New York, NY (US)

(72) Inventors: Dipti Ahuja, Basking Ridge, NJ (US); Victor Zhang, Plano, TX (US); Vinay Neeli, Irving, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 165 days.

(21) Appl. No.: 18/468,216

(22) Filed: Sep. 15, 2023

(65) Prior Publication Data
US 2025/0097309 A1    Mar. 20, 2025

(51) Int. Cl.
*H04L 67/306* (2022.01)
*H04L 9/40* (2022.01)

(52) U.S. Cl.
CPC ........ *H04L 67/306* (2013.01); *H04L 63/0838* (2013.01); *H04L 63/0861* (2013.01)

(58) Field of Classification Search
CPC .............. H04L 67/306; H04L 63/0838; H04L 63/0861
USPC ........................................................... 726/4
See application file for complete search history.

(56) References Cited

U.S. PATENT DOCUMENTS

| | | | |
|---|---|---|---|
| 2014/0143332 A1* | 5/2014 | Garg | G06F 16/24578 709/204 |
| 2018/0033011 A1* | 2/2018 | Bhattacharjee | G06Q 20/4014 |
| 2019/0005692 A1* | 1/2019 | Trim | G06F 17/18 |
| 2019/0007414 A1* | 1/2019 | Trim | G06F 16/288 |
| 2020/0257785 A1* | 8/2020 | Li | G06F 21/32 |
| 2021/0042408 A1* | 2/2021 | Van Dyke | G06F 21/552 |
| 2021/0105264 A1* | 4/2021 | Patel | H04L 63/0807 |
| 2021/0194872 A1* | 6/2021 | Chang | H04L 12/1895 |
| 2021/0194883 A1* | 6/2021 | Badhwar | H04L 63/107 |
| 2023/0044102 A1* | 2/2023 | Anderson | G06N 20/20 |
| 2024/0242223 A1* | 7/2024 | Loncaric | G06F 21/31 |
| 2024/0331037 A1* | 10/2024 | Pillai | G06Q 40/04 |

\* cited by examiner

*Primary Examiner* — Liang Che A Wang
(74) *Attorney, Agent, or Firm* — GREENBERG TRAURIG LLP

(57) ABSTRACT

In some aspects, the techniques described herein relate to a method including: receiving, at a change request service, a request to update contact information data; receiving, at the change request service, from a verification service provider, a raw ownership score; normalizing, by the change request service, the raw ownership score; sending, by the change request service, the contact information data, the customer identifier, and the normalized ownership score to a risk engine; receiving, by the change request service from the risk engine, a confidence score; providing, by the change request service, the confidence score, the normalized ownership score, and historical data associated with the stored customer profile, to a consolidation function; receiving, by the change request service and from the consolidation function, a consolidated trust score; and updating a datastore record associated with a customer represented by the customer identifier with the contact information data.

20 Claims, 3 Drawing Sheets

SYSTEMS AND METHODS FOR REAL-TIME IDENTITY PROOFING WITH VERIFICATION

BACKGROUND

1. Field of the Invention

Aspects generally relate to systems and methods for real-time identity proofing with verification.

2. Description of the Related Art

Organizations that persist their customer's personal information must generally provide a process that allows a customer to change the information when necessary. Such processes may introduce security risks to both the organization and the customer. Fraudulent actors may exploit security loopholes in an update process for changing personal information in order to steal a customer's identity and defraud both an organization and the organization's customer. Often, an organization that stores a client's personal information provides multiple processes through which customers can add and modify personal information (such as a telephone number, an electronic mail (email) address, a physical address, a legal name (last or first), etc.). This may be due to different systems owned/operated by different lines of business of an organization. Different technical backends for different products and services may manage personal information collection, storage, and updates with different interfaces, modules, storage schemas, etc., resulting in divergent processes and capabilities. Such divergence can result in disjointed user experiences and increased fraud across multiple data collection processes.

SUMMARY

In some aspects, the techniques described herein relate to a method including: receiving, at a change request service, a request to update contact information data, wherein the request to update the contact information data is associated with a stored customer profile; sending, by the change request service, the contact information data and a customer identifier to a verification service provider; receiving, at the change request service, from the verification service provider, and in response to the contact information data, a raw ownership score; normalizing, by the change request service, the raw ownership score, wherein normalizing the raw ownership score generates a normalized ownership score; sending, by the change request service, the contact information data, the customer identifier, and the normalized ownership score to a risk engine; receiving, by the change request service and as output from the risk engine, a confidence score; providing, by the change request service, the confidence score, the normalized ownership score, and historical data associated with the stored customer profile, to a consolidation function; receiving, by the change request service and from the consolidation function, a consolidated trust score; and updating, by the change request service and based on the consolidated trust score, a datastore record associated with a customer represented by the customer identifier with the contact information data.

In some aspects, the techniques described herein relate to a method, including: determining, by the change request service, that the consolidated trust score triggers a verification process.

In some aspects, the techniques described herein relate to a method, including: executing, by the change request service, the verification process, wherein the verification process include sending a challenge to a client application.

In some aspects, the techniques described herein relate to a method, wherein the challenge requests biometric information.

In some aspects, the techniques described herein relate to a method, wherein the challenge requests a one-time passcode.

In some aspects, the techniques described herein relate to a method, wherein the one-time passcode is sent via an out-of-band communication channel.

In some aspects, the techniques described herein relate to a method, wherein the verification process is completed and the customer is verified via the verification process.

In some aspects, the techniques described herein relate to a system including at least one computer including a processor, wherein the at least one computer is configured to: receive, at a change request service, a request to update contact information data, wherein the request to update the contact information data is associated with a stored customer profile; send, by the change request service, the contact information data and a customer identifier to a verification service provider; receive, at the change request service, from the verification service provider, and in response to the contact information data, a raw ownership score; normalize, by the change request service, the raw ownership score, wherein normalizing the raw ownership score generates a normalized ownership score; send, by the change request service, the contact information data, the customer identifier, and the normalized ownership score to a risk engine; receive, by the change request service and as output from the risk engine, a confidence score; provide, by the change request service, the confidence score, the normalized ownership score, and historical data associated with the stored customer profile, to a consolidation function; receive, by the change request service and from the consolidation function, a consolidated trust score; and update, by the change request service and based on the consolidated trust score, a datastore record associated with a customer represented by the customer identifier with the contact information data.

In some aspects, the techniques described herein relate to a system, wherein the at least one computer is configured to: determine, by the change request service, that the consolidated trust score triggers a verification process.

In some aspects, the techniques described herein relate to a system, wherein the at least one computer is configured to: execute, by the change request service, the verification process, wherein the verification process include sending a challenge to a client application.

In some aspects, the techniques described herein relate to a system, wherein the challenge requests biometric information.

In some aspects, the techniques described herein relate to a system, wherein the challenge requests a one-time passcode.

In some aspects, the techniques described herein relate to a system, wherein the one-time passcode is sent via an out-of-band communication channel.

In some aspects, the techniques described herein relate to a system, wherein the verification process is completed and the customer is verified via the verification process.

In some aspects, the techniques described herein relate to a non-transitory computer readable storage medium, including instructions stored thereon, which instructions, when read and executed by one or more computer processors, cause the one or more computer processors to perform steps including: receiving, at a change request service, a request to update contact information data, wherein the request to update the contact information data is associated with a stored customer profile; sending, by the change request service, the contact information data and a customer identifier to a verification service provider; receiving, at the change request service, from the verification service provider, and in response to the contact information data, a raw ownership score; normalizing, by the change request service, the raw ownership score, wherein normalizing the raw ownership score generates a normalized ownership score; sending, by the change request service, the contact information data, the customer identifier, and the normalized ownership score to a risk engine; receiving, by the change request service and as output from the risk engine, a confidence score; providing, by the change request service, the confidence score, the normalized ownership score, and historical data associated with the stored customer profile, to a consolidation function; receiving, by the change request service and from the consolidation function, a consolidated trust score; and updating, by the change request service and based on the consolidated trust score, a datastore record associated with a customer represented by the customer identifier with the contact information data.

In some aspects, the techniques described herein relate to a non-transitory computer readable storage medium, including: determining, by the change request service, that the consolidated trust score triggers a verification process.

In some aspects, the techniques described herein relate to a non-transitory computer readable storage medium, including: executing, by the change request service, the verification process, wherein the verification process include sending a challenge to a client application.

In some aspects, the techniques described herein relate to a non-transitory computer readable storage medium, wherein the challenge requests biometric information.

In some aspects, the techniques described herein relate to a non-transitory computer readable storage medium, wherein the challenge requests a one-time passcode.

In some aspects, the techniques described herein relate to a non-transitory computer readable storage medium, wherein the one-time passcode is sent via an out-of-band communication channel.

DETAILED DESCRIPTION

Figure 1:
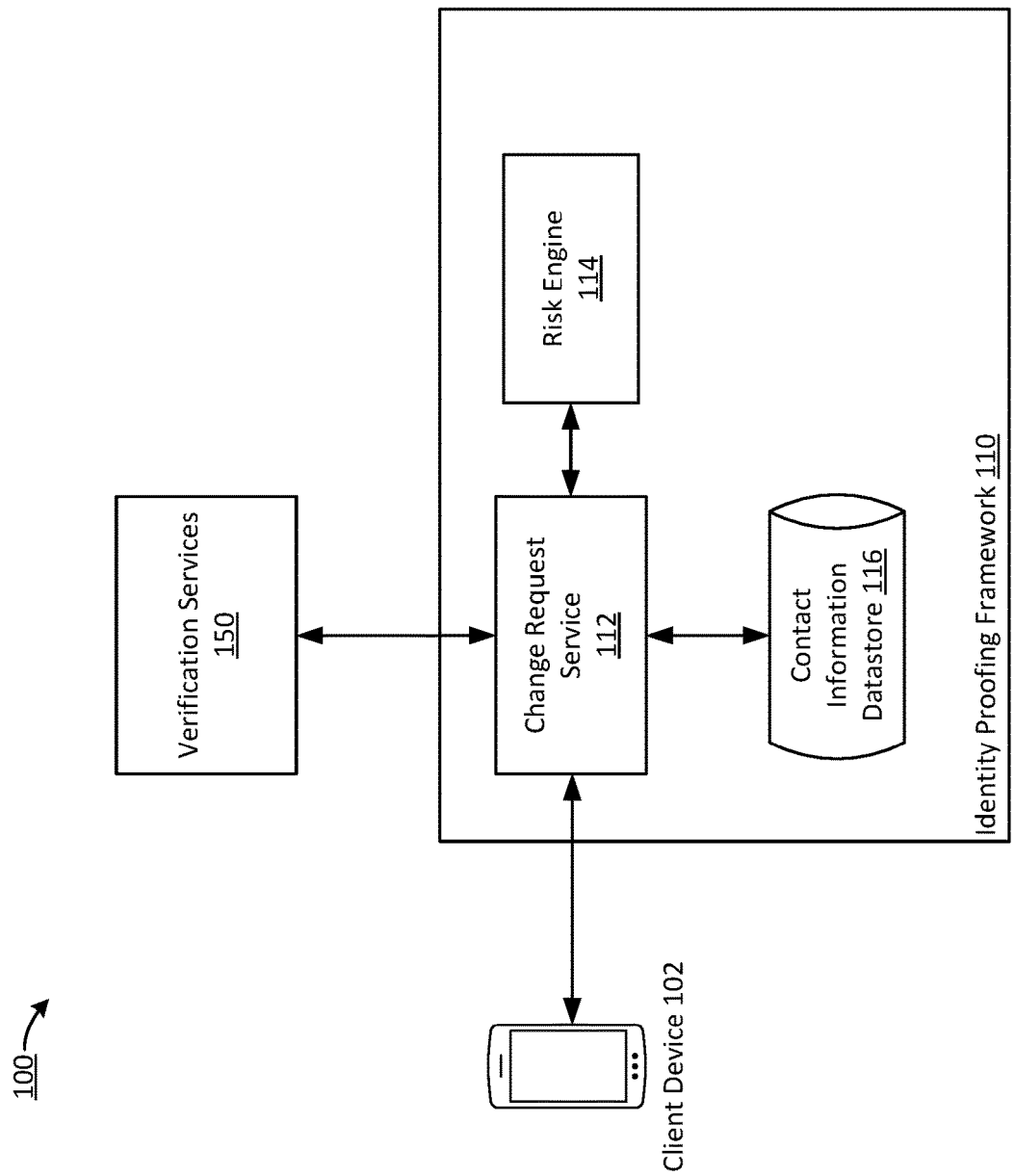
FIG. 1 is a block diagram of a system for real-time identity proofing, in accordance with aspects.

Aspects generally relate to systems and methods for real-time identity proofing with verification.

Aspects may consolidate user experiences, thereby streamlining product adoption, reducing fraud across servicing channels and improving time to market for securing demographic changes. In accordance with aspects, an organization's customers may provide multiple sets of personal contact information (personal information) such as a telephone number, an electronic mail (email) address, a physical address, and/or a legal name (last or first). A financial organization is exemplary, in that a customer may specify a preferred set of contact information based on financial relationships with minors, spouses or other legal relationships for various accounts held with the organization.

The various sets of contact information are accepted and stored by the organization and often times, there is limited proofing applied that ensures individuals who are supplying or changing contact information own the supplied data. This makes these processes susceptible to fraudulent activities, since threat actors may provide incorrect contact information in an attempt to, e.g., take over an account and misappropriate money therein. Potentially incorrect or fraudulent contact information may also make it difficult for legitimate customers to be contacted when sending a one-time passcode as text messages, making outbound calls to verify sensitive financial instructions, and making other sensitive transactions involving money movement that requires either a telephone number, address, or email address.

Aspects may perform both real-time and periodic offline verification of ownership of contact information proactively derived from leveraging an implementing organization's internal systems and application programming interfaces of third-party verification service providers (and data received therefrom). Customers that attempt to change contact information stored on an implementing organization's technology infrastructure may be sent challenges via digital channels requiring an appropriate response from the customer in order to document a desired trust level required to initiate a contact information change. Challenges may be based on a risk profile generated by an implementing organization, and appropriate answers to challenges may raise a trust level assigned to data received in an information change process. In accordance with aspects, an initial receipt of contact information (e.g., during an account setup process) may be treated in a same or similar manner as a request to change existing contact information.

Services (e.g., third-party commercial services) may be engaged to monitor contact information ownership/changes continuously and proactively. In some aspects, services may send an alert when a customer's mobile phone carrier network changes to a different carrier network or when a trust level associated with a telephone number, email address, physical address, etc., is impacted. Other alerts may be sent with respect to changes in other contact information, as well.

In accordance with aspects, an implementing organization may employ verification services (e.g., third-party services) to ingest contact information provided by customers. An application programming interface (API) call may be made to a service provider's interface, and may include, as parameters of an API method call, a set of customer contact information, including a customer identifier (e.g., a primary or other lookup key). An implementing organization may receive notifications from the verification service provider upon the initial API call including the parameterized contact information and customer identifier and may receive ongoing notifications of changes with respect to the provided contact information. Subsequent changes (after an initial API call) may be push notifications to a monitoring system of the implementing organization. A push notification payload may include a customer identifier (e.g., a primary or other lookup key) and data indicating the observed change. Change notifications may be receive by the implementing organization for changes to contact information such as a network carrier change with respect to a provided mobile phone number, changes in ownership of a provided mobile phone number, changes to a physical address, changes to email, etc. A change notification may also include a raw ownership score.

With each response to an API call or each push notification from a verification service provider, the service provider may provide a raw ownership score. A raw ownership score may be a score generated by the service provider that indicates a level of trust that a changed contact data parameter was made by, or is still associated with, a customer represented by a corresponding customer identifier. For instance, a response to an API method call that includes a customer identifier and a mobile phone number may return a raw ownership score that represents a level of trust that the mobile phone number is owned by the customer associated with the received customer identifier. Likewise, a response to an API method call that includes a customer identifier and a physical address may return a raw ownership score that represents a level of trust that the physical address is the address of the customer associated with the received customer identifier. A raw ownership score may be normalized by the receiving organization and may be paired with internal data associated with the relevant customer and a confidence score from a risk engine to determine a challenge procedure with respect to the relevant customer and an associated client device.

In accordance with aspects, an implementing organization may use data, including a raw ownership score received from a verification service to generate an internal consolidated trust score with respect to received contact information. An implementing organization may combine attributes received from a verification service and/or a raw ownership score received from a verification service with data attributes stored locally within the organization's technology infrastructure and, based on the data attributes, the raw ownership score, and a confidence score form an internal risk engine, may generate an internal consolidated trust score. An internal consolidated trust score may indicate a level of trust that provided contact information is authentic and may be used to trigger challenge/response procedures based on the value of the score. Internal consolidate trust score generation may be triggered via receipt of a request to change contact information from a customer, or a push notification received from a verification service (e.g., indicating a change in a customer's stored contact information and/or a raw ownership score indicating a trust level that a detected change is not fraudulent).

Generation of an internal trust score may include adjusting a raw ownership score to reflect a value that falls within a proprietary normalizing scale. That is, raw ownership scores having values outside of the bounds of a proprietary normalizing scale provided by an implementing organization may be adjusted to reflect a normalized ownership score that falls within the bounds of the scoring scale before further processing of the received ownership score. An exemplary normalizing scale may be from 0-100. Considering an exemplary normalizing scale scale from 0-100, raw ownership scores having values over 100 or under 0, may be normalized such that the normalized ownership score value falls between 0 and 100 on the normalizing scale.

A normalized ownership score may be used as input to a risk engine of an implementing institution. A risk engine may include algorithmic or rules-based logic that generates, and/or a machine learning (ML) model that is trained to generate, a confidence score. A ML model of a risk engine may be trained on internal organizational data. A risk engine may take, as input, a customer identifier, a contact information data point (e.g., a mobile phone number, a physical address, a name, or other personal contact information datapoint) for which a change request has been made, and a normalized ownership score. The risk engine may generate an output prediction of a likelihood that a requested data change is fraudulent, where the output is based on the algorithmic or ML processing of the input. Output from a risk engine may be in the form of a confidence score.

In accordance with aspects, a confidence score may be returned to a change request service of an implementing organization and may be further normalized by a consolidation function of a consolidation engine. A consolidation engine may take a confidence score from a risk engine, a normalized ownership score from a verification service, and additional historical data parameters associated with a relevant customer or customer profile as input. Based on the input, the consolidation engine may generate a consolidated trust score as output. A consolidated trust score may be normalized with respect to a challenge scale provided by an implementing organization.

A change request service may compare a consolidated trust score to various threshold values assigned to a challenge scale. The threshold values may define score ranges that indicate an action that may be taken with respect to a change request having a consolidated trust score falling into a given score range. For instance, ranges may be defined by a trusted threshold value and a flagged threshold value. In the case of an exemplary challenge scale having values between 0 and 100, a trusted threshold value may be set at, e.g., 90, and a flagged threshold value may be set at, e.g., 20.

Accordingly, if a consolidated trust score is equal to or higher than the trusted threshold value (e.g., equal to or higher than 90), the received contact information may be used to update a customer record without customer verification of the change request via a challenge/response procedure (i.e., a challenge/response procedure is not triggered). If a consolidated trust score falls under a trusted threshold value, but over a flagged threshold (e.g., lower than 90, but over 20, where 20 is the flagged threshold value), then a challenge/response procedure may be triggered in order to verify a received contact information change request. Receipt of an appropriate response to the challenge may be required in order for the requested information change to be executed. If the consolidated trust score falls at or under a flagged threshold value, then the requested contact information change may be disregarded, and appropriate alert messages may be sent to existing customer contact information, an associated account may be locked, and/or other security measures may be executed to prevent fraudulent activity with respect to the customer's account with the implementing organization.

FIG. 1 is a block diagram of a system for real-time identity proofing, in accordance with aspects. System 100 includes identity proofing framework 110, verification services 150, and client device 102. Identity proofing framework 110 includes change request service 112, risk engine 114, and contact information datastore 116. Identity proofing framework 110 and components thereof may be included in an implementing organization's technology infrastructure.

Client device 102 may execute a client application provided by an implementing organization. The client application may be configured to be in operative communication with change request service 112. For instance, client device 102 may send an authentication request for a user of the client application. Identity proofing framework 110 may authenticate the user and may hold a customer identifier that uniquely identifies an account and database records that are associated with the received authenticated information and that are stored in contact information datastore 116. The customer identifier may be a lookup key (e.g., a primary key) that may be used to perform create, read, update, and delete operations on data fields related to the customer identifier in contact information datastore 116.

After authentication, change request service 112 may receive a request to update contact information for the authenticated user. Change request service 112 may pass the customer identifier and the contact information data (e.g., mobile phone number, address, etc.) that has been requested be changed to verification services 150. This data may be passed via a call to a method exposed via an application programming interface of verification services 150. In response, change request service 112 may receive a raw ownership score that indicates a level of trust assigned by verification services 150 that the received contact information data is legitimately associated with (i.e., "owned" by) the customer represented by the received customer identifier. Verification services 150 may store records associated with the customer represented by the received customer identifier and may execute various verification, authentication, validation, and other services to determine the raw ownership score that is returned.

In accordance with aspects, change request service 112 may receive the raw ownership score as, e.g., a response to an API method call. In other aspects, a raw ownership score may be received as a push notification in response to verification services 150 detecting a change or anomaly in contact data related to a customer identifier provided by change request service 112 (i.e., without change request service 112 having made an API method call and passing data to verification services 150). Change request service 112 may normalize the received raw ownership score as discussed in more detail, herein. Change request service 112 may pass the normalized ownership score to risk engine 114 along with the associated customer identifier and the contact information data as input parameters to risk engine 114. Risk engine 114 may take these data parameters as input and may process the data parameters. Risk engine 114 may include rules-based algorithms and/or a ML model that may process the received parameters. Risk engine 114 may output a confidence score based on the received parameters and may pass the confidence score back to change request service 112.

In accordance with aspects, change request service 112 may receive the confidence score and may provide the confidence score from a risk engine 1114, a normalized ownership score from a verification service, and additional historical data parameters associated with a relevant customer or customer profile as input to a consolidation function (not shown) of change request service 112. Based on the input, the consolidation engine may generate a consolidated trust score as output. A consolidated trust score may be normalized with respect to a challenge scale provided by an implementing organization.

Based on a value of the consolidated trust score, change request service 112 may determine a predefined range of a challenge scale that the consolidated trust score is associated with. As discussed above, an exemplary challenge scale may have values between 0 and 100, and each value may be included in one range of multiple ranges defined for the scoring scale. Change request service 112 may match a value of the consolidated trust score to a value of the scoring scale and, based on the range that the value of the scoring scale that matches the value of the consolidated trust score is included in, may execute further processing.

In an exemplary aspect, a challenge scale may be assigned three ranges based on threshold values. The threshold values may define score ranges that indicate an action that may be taken with respect to a change request having a consolidated trust score falling into a given score range. For instance, ranges may be defined by a trusted threshold value and a flagged threshold value. In the case of an exemplary scoring scale having values between 0 and 100, a trusted threshold value may be set at, e.g., 90, and a flagged threshold value may be set at, e.g., 20.

In accordance with aspects, if a consolidated trust score is equal to or higher than the trusted threshold value (e.g., equal to or higher than 90), change request service 112 may execute an update procedure to update contact information datastore 116 with the new contact information received from client device 102 without further action (i.e., without further verification action). If a consolidated trust score falls under a trusted threshold value, but over a flagged threshold value (e.g., lower than 90, but over 20, where 20 is the flagged threshold value), then change request service 112 may initiate a challenge/response procedure in order to verify the contact information received from client device 102. If the consolidated trust score falls at or under a flagged threshold value, then change request service 112 may stop the change request process, not make any information update, and initiate security measures to prevent fraudulent activity with respect to the customer's account with the implementing organization.

If a consolidated trust score initiates a verification (or challenge-response) procedure, then change request service 112 may respond to client device 102 with a challenge. A challenge may include requesting information that only the authentic customer may be able to provide. For instance, a challenge may request biometric data from the user, such as a fingerprint, retina, or facial scan of the user. An implementing organization may request and store biometric information at, e.g., account creation so that the stored biometric information may be later compared to biometric information received in a verification process. Such biometric data may be retrieved by client device 102 using cameras built in scanners, etc.

In other aspects, a challenge may request a one-time passcode (OTP) from the user. The OTP may be requested through an interface of the client application. Change request service 112, however, may send the OTP to the user via an out-of-band communication channel (i.e., a communication channel that is accessible to change request service 112, but is not provided by change request service 112). Exemplary out-of-band communication channels include email services, text message services and the like. Accordingly, a user may retrieve the OTP from the out-of-band channel and input the OTP in the interface of the client application. The client application may then send the OTP to change request service 112 and change request service 112 may verify that the received OTP matches the OTP sent via the out-of-band channel.

In accordance with aspects, if a verification process is successfully completed, change request service 112 may execute the requested change by updating contact information in contact information datastore 116 with new contact information received from client device 102.

Figure 2:
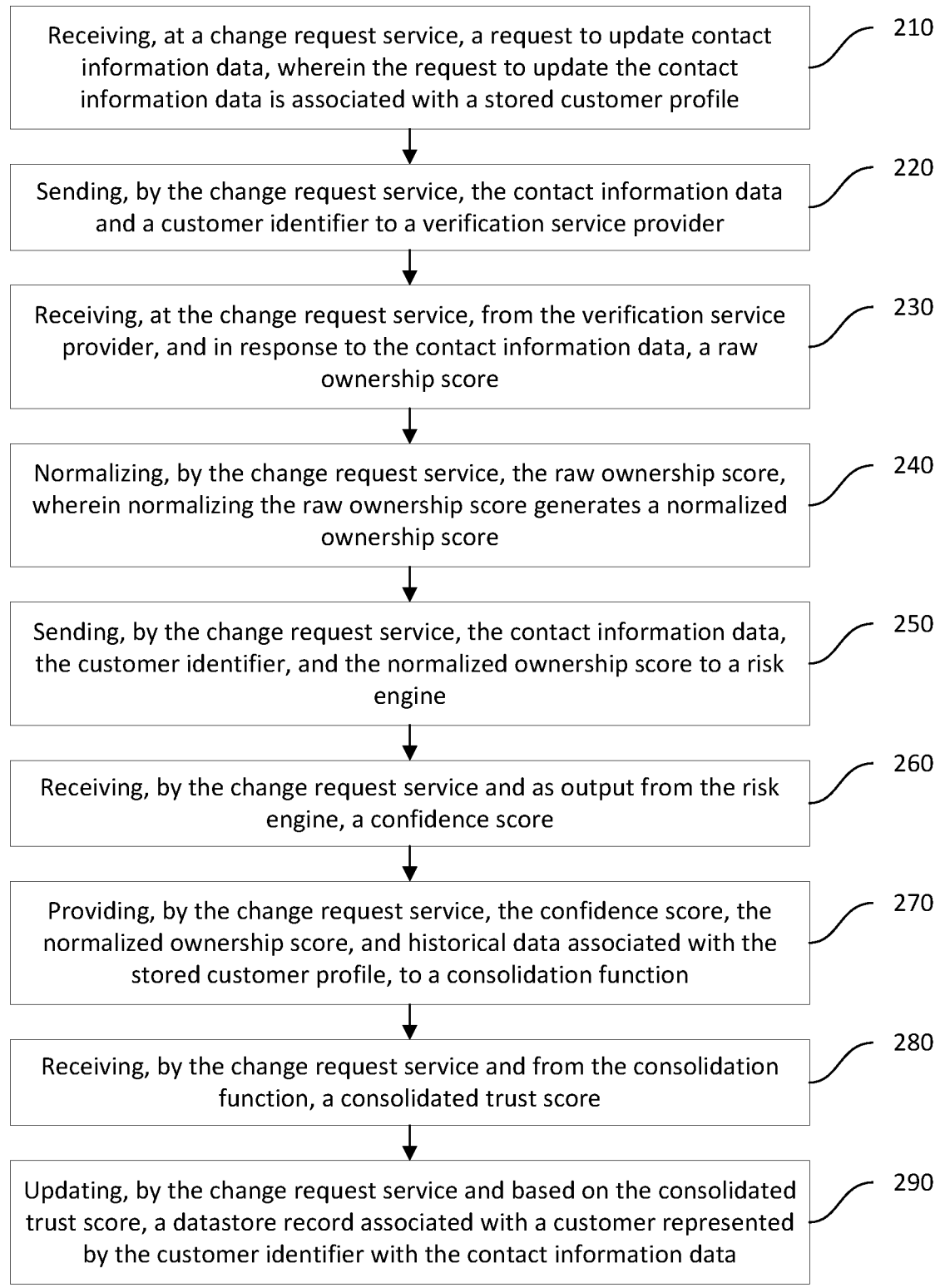
FIG. 2 is a logical flow for real-time identity proofing, in accordance with aspects.

FIG. 2 is a logical flow for real-time identity proofing, in accordance with aspects.

Step 210 includes receiving, at a change request service, a request to update contact information data, wherein the request to update the contact information data is associated with a stored customer profile.

Step 220 includes sending, by the change request service, the contact information data and a customer identifier to a verification service provider.

Step 230 includes receiving, at the change request service, from the verification service provider, and in response to the contact information data, a raw ownership score.

Step 240 includes normalizing, by the change request service, the raw ownership score, wherein normalizing the raw ownership score generates a normalized ownership score.

Step 250 includes sending, by the change request service, the contact information data, the customer identifier, and the normalized ownership score to a risk engine.

Step 260 includes receiving, by the change request service and as output from the risk engine, a confidence score.

Step 270 includes providing, by the change request service, the confidence score, the normalized ownership score, and historical data associated with the stored customer profile, to a consolidation function.

Step 280 includes receiving, by the change request service and from the consolidation function, a consolidated trust score.

Step 290 includes updating, by the change request service and based on the consolidated trust score, a datastore record associated with a customer represented by the customer identifier with the contact information data.

Figure 3:
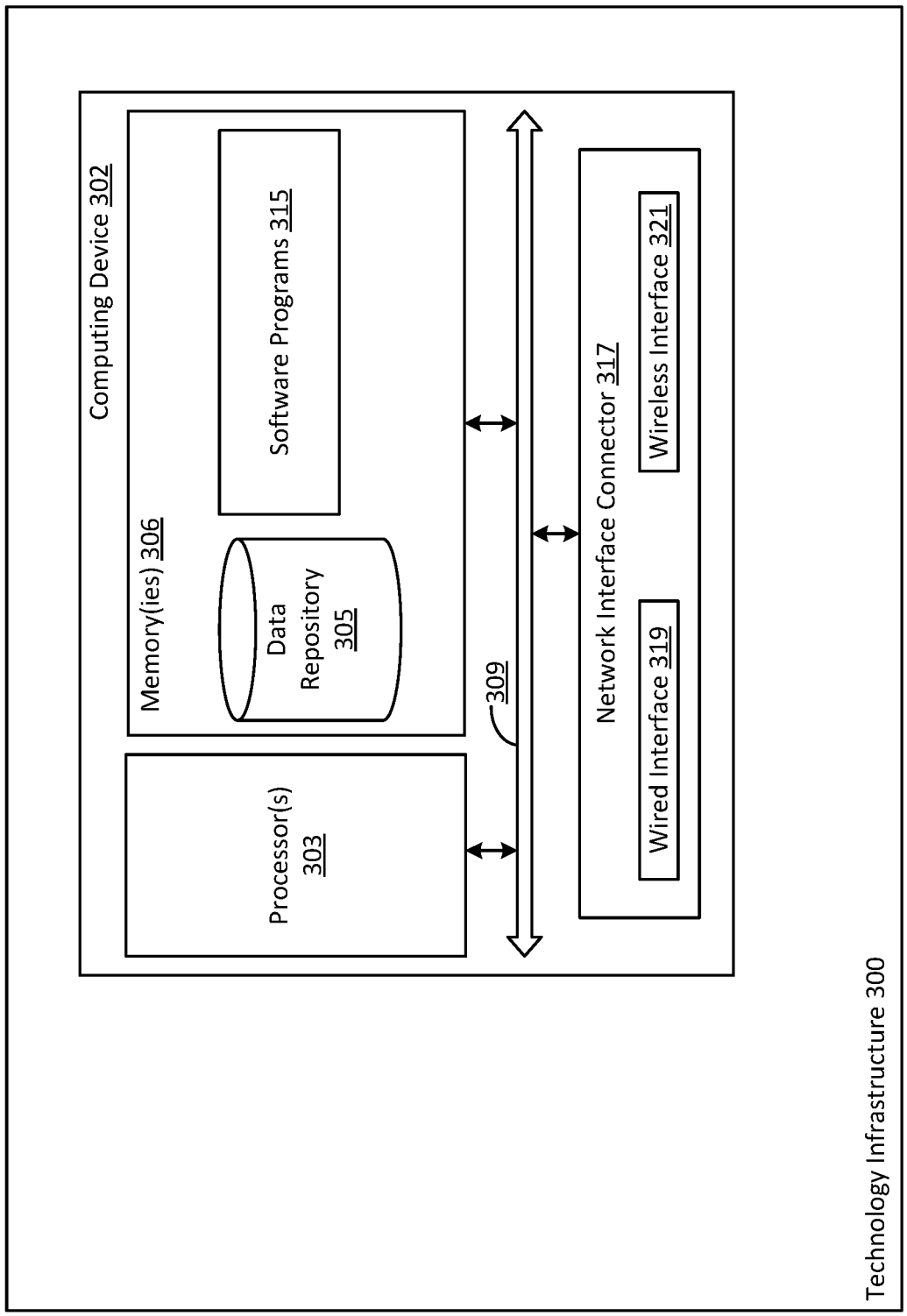
FIG. 3 is a block diagram of a technology infrastructure and computing device for implementing certain aspects of the present disclosure, in accordance with aspects.

FIG. 3 is a block diagram of a technology infrastructure and computing device for implementing certain aspects of the present disclosure, in accordance with aspects. FIG. 3 includes technology infrastructure 300. Technology infrastructure 300 represents the technology infrastructure of an implementing organization. Technology infrastructure 300 may include hardware such as servers, client devices, and other computers or processing devices. Technology infrastructure 300 may include software (e.g., computer) applications that execute on computers and other processing devices. Technology infrastructure 300 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 300 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 300 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 300 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper of fiber optic wire/cable) that forms a physical computer network. Routers, switches, and firewalls may also have "wireless" interfaces that facilitate data transmissions via radio waves. A computer network included in technology infrastructure 300 may include both wired and wireless components and interfaces and may interface with servers and other hardware via either wired or wireless communications. A computer network of technology infrastructure 300 may be a private network but may interface with a public network (such as the internet) to facilitate operative communication between computers executing on technology infrastructure 300 and computers executing outside of technology infrastructure 300.

FIG. 3 further depicts exemplary computing device 302. Computing device 302 depicts exemplary hardware that executes the logic that drives the various system components described herein. Servers and client devices may take the form of computing device 302. While shown as internal to technology infrastructure 300, computing device 302 may be external to technology infrastructure 300 and may be in operative communication with a computing device internal to technology infrastructure 300.

In accordance with aspects, system components such as a change request service, a risk engine, a client device, verification services, servers, various database engines and database services, and other computer applications and logic may include, and/or execute on, components and configurations the same, or similar to, computing device 302.

Computing device 302 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 302 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components.

Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   receiving, at a change request service, a request to update contact information data, wherein the request to update the contact information data is associated with a stored customer profile;
   sending, by the change request service, the contact information data and a customer identifier to a verification service provider;
   receiving, at the change request service, from the verification service provider, and in response to the contact information data, a raw ownership score;
   normalizing, by the change request service, the raw ownership score, wherein normalizing the raw ownership score generates a normalized ownership score;
   sending, by the change request service, the contact information data, the customer identifier, and the normalized ownership score to a risk engine;
   receiving, by the change request service and as output from the risk engine, a confidence score;
   providing, by the change request service, the confidence score, the normalized ownership score, and historical data associated with the stored customer profile, to a consolidation function;
   receiving, by the change request service and from the consolidation function, a consolidated trust score; and
   updating, by the change request service and based on the consolidated trust score, a datastore record associated with a customer represented by the customer identifier with the contact information data.

2. The method of claim 1, comprising:
   determining, by the change request service, that the consolidated trust score triggers a verification process.

3. The method of claim 2, comprising:
   executing, by the change request service, the verification process, wherein the verification process include sending a challenge to a client application.

4. The method of claim 3, wherein the challenge requests biometric information.

5. The method of claim 3, wherein the challenge requests a one-time passcode.

6. The method of claim 5, wherein the one-time passcode is sent via an out-of-band communication channel.

7. The method of claim 3, wherein the verification process is completed and the customer is verified via the verification process.

8. A system comprising at least one computer including a processor, wherein the at least one computer is configured to:
   receive, at a change request service, a request to update contact information data, wherein the request to update the contact information data is associated with a stored customer profile;
   send, by the change request service, the contact information data and a customer identifier to a verification service provider;
   receive, at the change request service, from the verification service provider, and in response to the contact information data, a raw ownership score;
   normalize, by the change request service, the raw ownership score, wherein normalizing the raw ownership score generates a normalized ownership score;
   send, by the change request service, the contact information data, the customer identifier, and the normalized ownership score to a risk engine;
   receive, by the change request service and as output from the risk engine, a confidence score;
   provide, by the change request service, the confidence score, the normalized ownership score, and historical data associated with the stored customer profile, to a consolidation function;
   receive, by the change request service and from the consolidation function, a consolidated trust score; and
   update, by the change request service and based on the consolidated trust score, a datastore record associated with a customer represented by the customer identifier with the contact information data.

9. The system of claim 8, wherein the at least one computer is configured to:
   determine, by the change request service, that the consolidated trust score triggers a verification process.

10. The system of claim 9, wherein the at least one computer is configured to:
    execute, by the change request service, the verification process, wherein the verification process include sending a challenge to a client application.

11. The system of claim 10, wherein the challenge requests biometric information.

12. The system of claim 10, wherein the challenge requests a one-time passcode.

13. The system of claim 12, wherein the one-time passcode is sent via an out-of-band communication channel.

14. The system of claim 10, wherein the verification process is completed and the customer is verified via the verification process.

15. A non-transitory computer readable storage medium, including instructions stored thereon, which instructions, when read and executed by one or more computer processors, cause the one or more computer processors to perform steps comprising:
    receiving, at a change request service, a request to update contact information data, wherein the request to update the contact information data is associated with a stored customer profile;
    sending, by the change request service, the contact information data and a customer identifier to a verification service provider;

receiving, at the change request service, from the verification service provider, and in response to the contact information data, a raw ownership score;

normalizing, by the change request service, the raw ownership score, wherein normalizing the raw ownership score generates a normalized ownership score;

sending, by the change request service, the contact information data, the customer identifier, and the normalized ownership score to a risk engine;

receiving, by the change request service and as output from the risk engine, a confidence score;

providing, by the change request service, the confidence score, the normalized ownership score, and historical data associated with the stored customer profile, to a consolidation function;

receiving, by the change request service and from the consolidation function, a consolidated trust score; and updating, by the change request service and based on the consolidated trust score, a datastore record associated with a customer represented by the customer identifier with the contact information data.

16. The non-transitory computer readable storage medium of claim 15, comprising:

determining, by the change request service, that the consolidated trust score triggers a verification process.

17. The non-transitory computer readable storage medium of claim 16, comprising:

executing, by the change request service, the verification process, wherein the verification process include sending a challenge to a client application.

18. The non-transitory computer readable storage medium of claim 17, wherein the challenge requests biometric information.

19. The non-transitory computer readable storage medium of claim 17, wherein the challenge requests a one-time passcode.

20. The non-transitory computer readable storage medium of claim 19, wherein the one-time passcode is sent via an out-of-band communication channel.

* * * * *